J. HARRIS.
Vehicle Wheel.
No. 113,050.  Patented March 28, 1871.
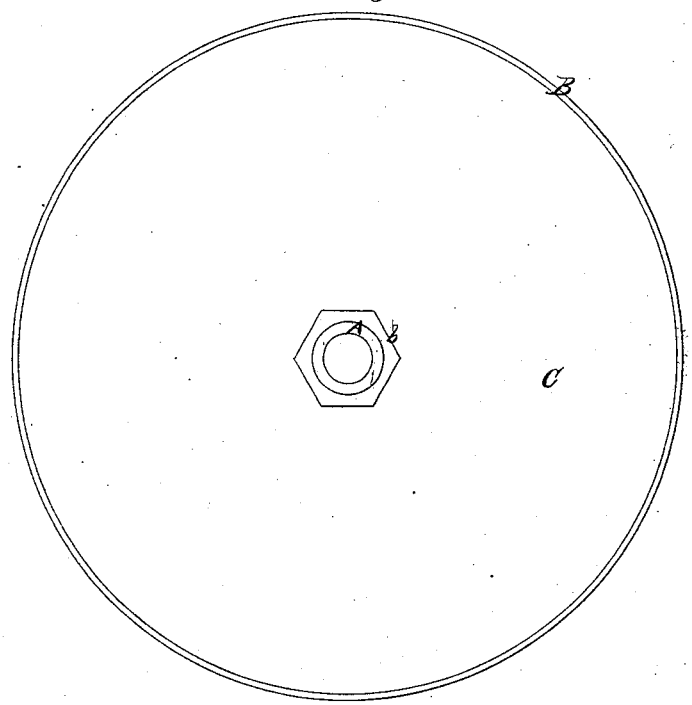
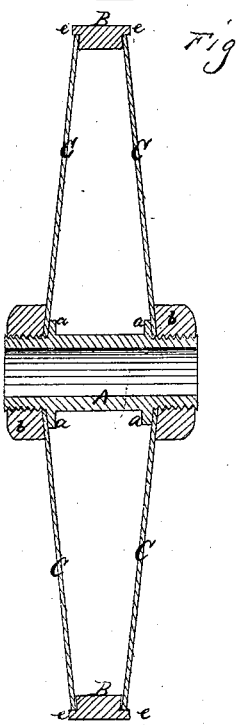

UNITED STATES PATENT OFFICE.

JAMES HARRIS, OF SAN FRANCISCO, CALIFORNIA.

IMPROVEMENT IN WHEELS FOR VEHICLES.

Specification forming part of Letters Patent No. 113,050, dated March 28, 1871.

*To all whom it may concern:*

Be it known that I, JAMES HARRIS, of San Francisco, county of San Francisco, State of California, have invented an Improved Metallic Wheel; and I do hereby declare the following description and accompanying drawing are sufficient to enable any person skilled in the art or science to which it most nearly appertains to make and use my said invention or improvements without further invention or experiment.

My improvement in metallic wheels consists in making the wheel with sheet or plate iron sides, which extend from the hub to the rim, leaving a hollow space between them, thus forming a metallic box-wheel, suitable more particularly for use as bearing-wheels for gangplows, and presenting the advantage of having no spokes or projecting parts to gather mud or dirt, but coming and freeing itself continually.

In order to properly construct this wheel, a peculiar tire and hub is required, which also comprises a part of my invention.

Referring to the accompanying drawing, forming a part of this specification, for a more complete explanation of my invention, A represents the hub, and B the tire, of my wheel. The hub has two flanges, *a a*, at a short distance apart, one being near each end. The side plates, C, are circular plates of sheet metal of the desired diameter, and each one has a hole through its center of sufficient size to allow it to slip on over the end of the hub and fit against one of the flanges *a*. The plates C are placed one upon each end of the hub, as shown, and nuts *b* are screwed on over the end of the hub, so as to bind the plates C between them and the flanges *a*. The tire B is a circular metallic band, having its sides rabbeted, as shown, so as to leave on the outer edge a projecting flange, *e*, of the width desired for the exposed tire. This tire is placed between the two plates C, so that the outer rims of the side plates will fit into the rabbets on the opposite sides of the tire. The rims of the side plates are then secured to the tire by screws, rivets, bolts, or other fastening device, thus completing the wheel.

This manner of constructing metallic wheels will be of great advantage, as above stated, when they are intended to move over loose, wet, or damp ground, as no particles of earth can adhere to them, as is the case when the ordinary spoke-wheel is used. It will be useful more especially in that portion of the country where the ground is a stiff adobe, as in California, where wheels moving over plowed ground accumulate large masses of earth, greatly hindering the plowing.

The wheel can be very cheaply constructed by employing sheet-iron sides, and will be very strong and substantial.

Having thus described my invention, what I claim, and desire to secure by Letters Patent, is—

The tire B, rabbeted, as described, or provided with equivalent projections for holding the circular plates C, in combination with the flanged hub A and nuts *b b*, the whole forming a wheel, as described.

In witness that the above-described invention is claimed by me I have hereunto set my hand and seal.

JAMES HARRIS. [L. S.]

Witnesses:
 GEO. H. STRONG,
 J. L. BOONE.